(12) United States Patent
Thomson et al.

(10) Patent No.: US 6,304,760 B1
(45) Date of Patent: Oct. 16, 2001

(54) METHOD FOR REDUCING THE EFFECT OF ATMOSPHERIC DUCTING ON WIRELESS TRANSMISSIONS

(75) Inventors: David Thomson, Murray Hill; John Anthony Tyson, Pottersville, both of NJ (US)

(73) Assignee: Lucent Technologies, Inc., NJ (US)

( * ) Notice: Subject to any disclaimer, the term of this patent is extended or adjusted under 35 U.S.C. 154(b) by 0 days.

(21) Appl. No.: 09/330,855

(22) Filed: Jun. 11, 1999

(51) Int. Cl.[7] ........................................... H04B 7/26
(52) U.S. Cl. ..................... 455/503; 455/506; 455/562; 455/67.6
(58) Field of Search ................... 455/503, 67.6, 455/62, 63, 504, 423, 424, 562, 67.1

(56) References Cited

U.S. PATENT DOCUMENTS

| | | | |
|---|---|---|---|
| 5,669,063 | * 9/1997 | Brockel et al. | 455/506 |
| 5,966,658 | * 10/1999 | Kennedy, III et al. | 455/426 |
| 6,021,316 | * 2/2000 | Heiska et al. | 455/67.6 |
| 6,115,614 | * 9/2000 | Furukawa | 455/525 |
| 6,169,881 | * 1/2001 | Astrom et al. | 455/12.1 |

\* cited by examiner

*Primary Examiner*—Daniel Hunter
*Assistant Examiner*—Alan T. Gantt

(57) ABSTRACT

A method and system for reducing the effects of atmospheric ducting on wireless transmissions, wherein a wireless communication system is comprised of a plurality of base stations having antennas, each base station having a beacon signal transmitter and a beacon signal receiver. Each beacon signal transmitter is configured to transmit a wireless beacon signal to be received by the beacon signal receiver at other, preferably every other, base stations. For each wireless beacon signal, a time delay and a propagation loss is measured. Each measured time delay and propagation loss is compared to an expected time delay and an expected propagation loss corresponding to the wireless beacon signal. The results of the comparison are processed so as to determine a location of atmospheric ducts in the region serviced by the wireless system. Once an atmospheric duct has been located, the antennas of the base stations in the wireless system are arranged so as minimize the transmission of the wireless beacon signals through the duct location.

19 Claims, 7 Drawing Sheets

METHOD FOR REDUCING THE EFFECT OF ATMOSPHERIC DUCTING ON WIRELESS TRANSMISSIONS

FIELD OF THE INVENTION

This invention relates to wireless transmissions, and more specifically to a system and method for reducing the effect of atmospheric ducting on wireless transmissions.

BACKGROUND OF THE INVENTION

FIG. 1 illustrates a typical wireless telecommunications system, such as employed by a cellular telephone network, comprising a plurality of base stations, depicted by base stations 203-1 through 203-5. Wireless terminals, depicted by terminals 201-1 through 201-3, communicate with a base station which is located in the same pre-determined geographic area, or cell, as itself. For instance, wireless terminals 201-1 and 201-2 are located in cell A, therefore, under normal circumstances, communicate with base station 203-1, which is located in and services cell A.

As is well-known in the art, in order for wireless terminal 201-1 to communicate, it sends a signal via radio waves to base station 203-1; base station 203-1 relays the received signal to a switching center (not shown); and the switching center, according to instructions supplied as part of the signal, relays the signal elsewhere. If the desired destination of the signal is another wireless terminal, then the switching center relays the signal to a base station located in the same cell as the wireless terminal intended to receive the signal, and the base station transmits the signal via radio waves to the wireless terminal.

One problem experienced by cellular phone systems, or any wireless transmission system, is that of unintentionally terminated, or "dropped", calls. A large fraction of dropped calls are caused by weather patterns. This is illustrated in FIG. 2, which is a graph that shows a percentage of cellular calls that were dropped between Jan. 1, 1996 and approximately Jun. 1, 1997. As shown, a significantly larger percentage of calls are dropped during the summer months than are dropped during other times of the year. It has been determined that, while several factors are responsible for the increased percentage of dropped calls, the largest contributing factor is an atmospheric condition known as tropospheric, or atmospheric, ducting (hereinafter referred to as "ducting").

Generally, ducting is a radio wave propagation mechanism that occurs when, due to weather conditions in the atmosphere, the curvature of the path of a wireless radio wave transmission exceeds the curvature of the earth's surface. As a result, the radio wave is received back at the earth's surface far beyond the distance which would normally be expected. The atmospheric conditions that cause the excessive curvature of the radio wave have distinctive refractive properties, as discussed below. Refraction is the deflection of an energy wave from a straight path, caused when the energy wave passes from one medium through which the energy wave travels at a first velocity, into another medium through which the energy wave travels at a different velocity. Refraction is well-known in the art, as are the refractive properties that result in ducting. These are described in H. Hitney, *Propagation Modelling and Decision Aids for Communications Radar and Navigation Systems*, AGARD Lecture Series (September 1994), which is incorporated herein as fully as if set forth in its entirety, and are discussed below.

Briefly, as shown in FIG. 3, when a radio wave is transmitted from transmission point 101, it moves through the atmosphere in a straight line, shown as path 102a, until it reaches an atmospheric layer having a refractive index, n. The refractive index n is defined as n=c/v, wherein c and v are the speeds of an energy wave (such as a wireless transmission) in a vacuum and in the atmosphere, respectively. In this case, the radio wave enters atmospheric layer 103, which has a different refractive index, designated as $n_0$, which is different from the refractive index of the atmospheric layer through which the radio wave was originally transmitted. The different refractive index causes the radio wave to travel at a different velocity and hence causes the path of the radio wave to bend. As a result, the radio wave travels in a new path, shown as path 102b. When the radio wave enters yet another atmospheric layer 104, which has a refractive index different from $n_0$, the path of the radio wave bends again so as to travel in path 102c. As a result, radio waves may travel in various patterns as governed by refractive conditions of the atmosphere based on the refractivity of various atmospheric layers.

Refractivity N is a measure of a medium's (e.g.—an atmospheric layer) power to refract an energy wave, and is defined as $N=(n-1)\times 10^6$. Refractivity is related to atmospheric parameters by the formula $N=77.6[P/T+4810e/T^2]$, wherein P is pressure (hPa), T is temperature (K), and e is partial water vapor pressure. FIG. 4 is a diagram showing four types of refractive conditions that can be experienced by a wireless transmission: trapping, superrefractive, normal and subrefractive. Table 1 indicates the refractivity ranges that result in each refractive condition. As can be seen from Table 1 and FIG. 4, ducting occurs when a trapping refractive condition exists, i.e.—when a radio wave encounters an atmospheric condition having a refractivity wherein Nper kilometer of height <−157. Thus, when an atmosphere has pressure, temperature, and partial water vapor pressure conditions resulting in the refractivity of the atmospheric layer being less than −157 N/km, radio waves passing through the atmospheric layer are trapped and propagate far beyond their expected range.

When this excessive propogation occurs, a wireless transmission (such as a call from a cellular telephone) intended to be transmitted to a nearby receiver station (such as a base station located in the cell in which the cellular phone caller is located) can instead be transmitted to a receiver station much farther away. In some applications, such as radar, this situation may be advantageous. However, in a cellular phone system, it may result in calls being setup at abnormally long distances, such as a 911 emergency call inadvertently being transmitted to a location a far distance from the location of the call, or the imposition of unnecessary long distance charges. More significantly from the standpoint of dropped calls, this situation may result in wireless signals from distant cells causing interference levels in a local cell to increase undesirably. It is this increased interference from distant cells which contributes to the increased number of dropped calls, particularly during the summer months, as wireless transmissions handled by the base station of a local cell are interrupted by wireless transmissions originating from locations at a far distance from the base station.

Thus, there is a need for a system and method that reduces the effect of atmospheric ducting on wireless transmissions.

SUMMARY OF THE INVENTION

A system and method for reducing the effects of atmospheric ducting on wireless transmissions is disclosed. In accordance with one embodiment of the invention, a wireless communication system is comprised of a plurality of base stations having antennas, each base station having a beacon signal transmitter and a beacon signal receiver. Each beacon signal transmitter is configured to transmit a wireless beacon signal to be received by the beacon signal receiver at other base stations. For each wireless beacon signal, a time delay and a propagation loss is measured. Each measured time delay and propagation loss is compared to an expected time delay and an expected propagation loss corresponding to the wireless beacon signal.

The results of the comparison are processed so as to determine a location of an atmospheric duct. By using tomography, an accurate map or profile of the atmosphere is determined, locating regions where atmospheric ducting is occuring. Once an atmospheric duct has been located, the antennas of the base stations in the wireless system, which utilize a phase array arrangement as an example, are tuned knowing of the location of the atmospheric duct. By doing so, each base station antenna is less likely to transmit wireless transmissions through the duct, and interference is reduced.

In one embodiment of the invention, each beacon signal transmitter is configured to transmit a wireless beacon signal to be received by the beacon signal receiver at every other base station. In another embodiment of the invention, the antennas of the base stations in the wireless system are arranged so as minimize the transmission of wireless signals through the duct location.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
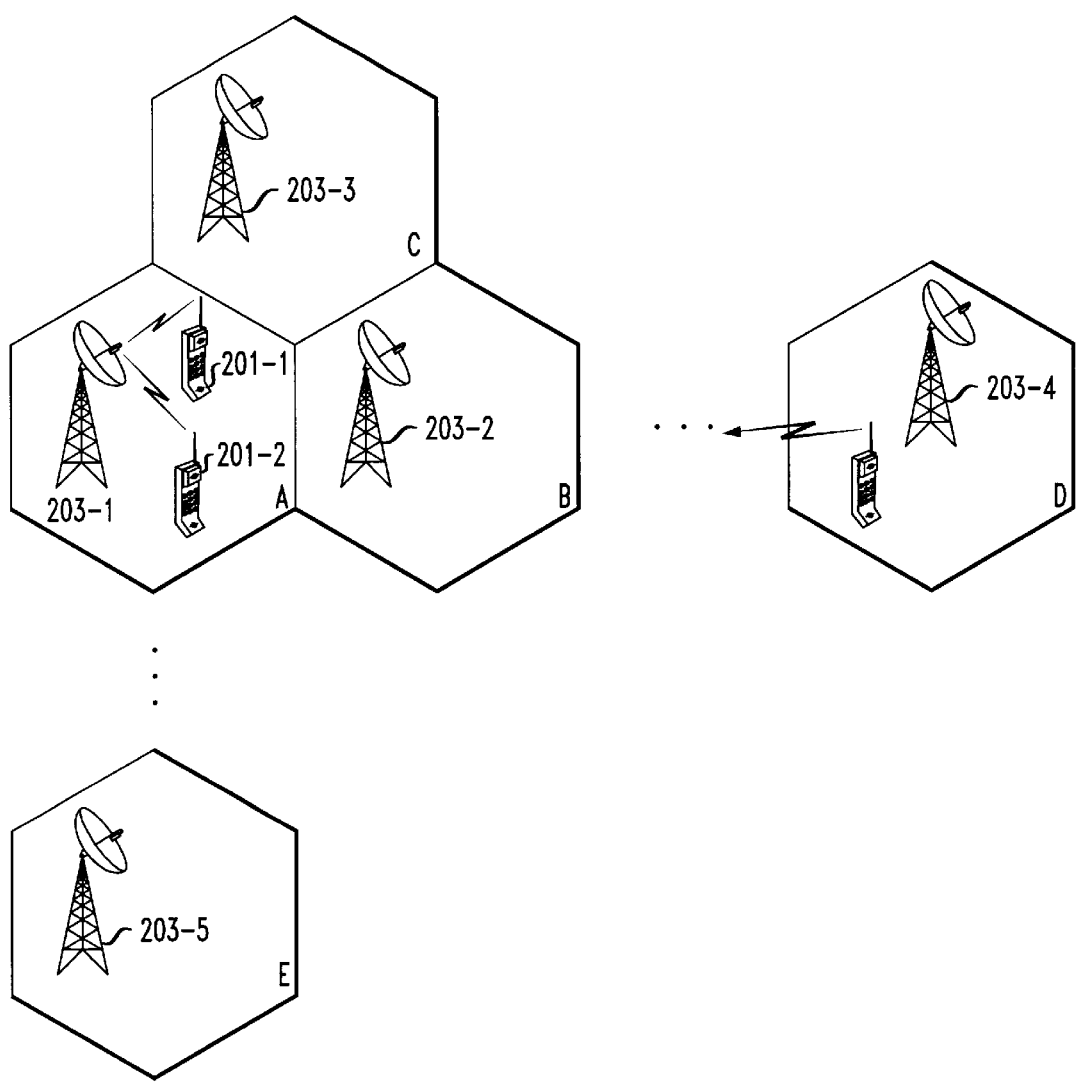
FIG. 1 illustrates a typical wireless telecommunications system, such as employed by a cellular telephone network, in accordance with one embodiment of the present invention.
Figure 2:
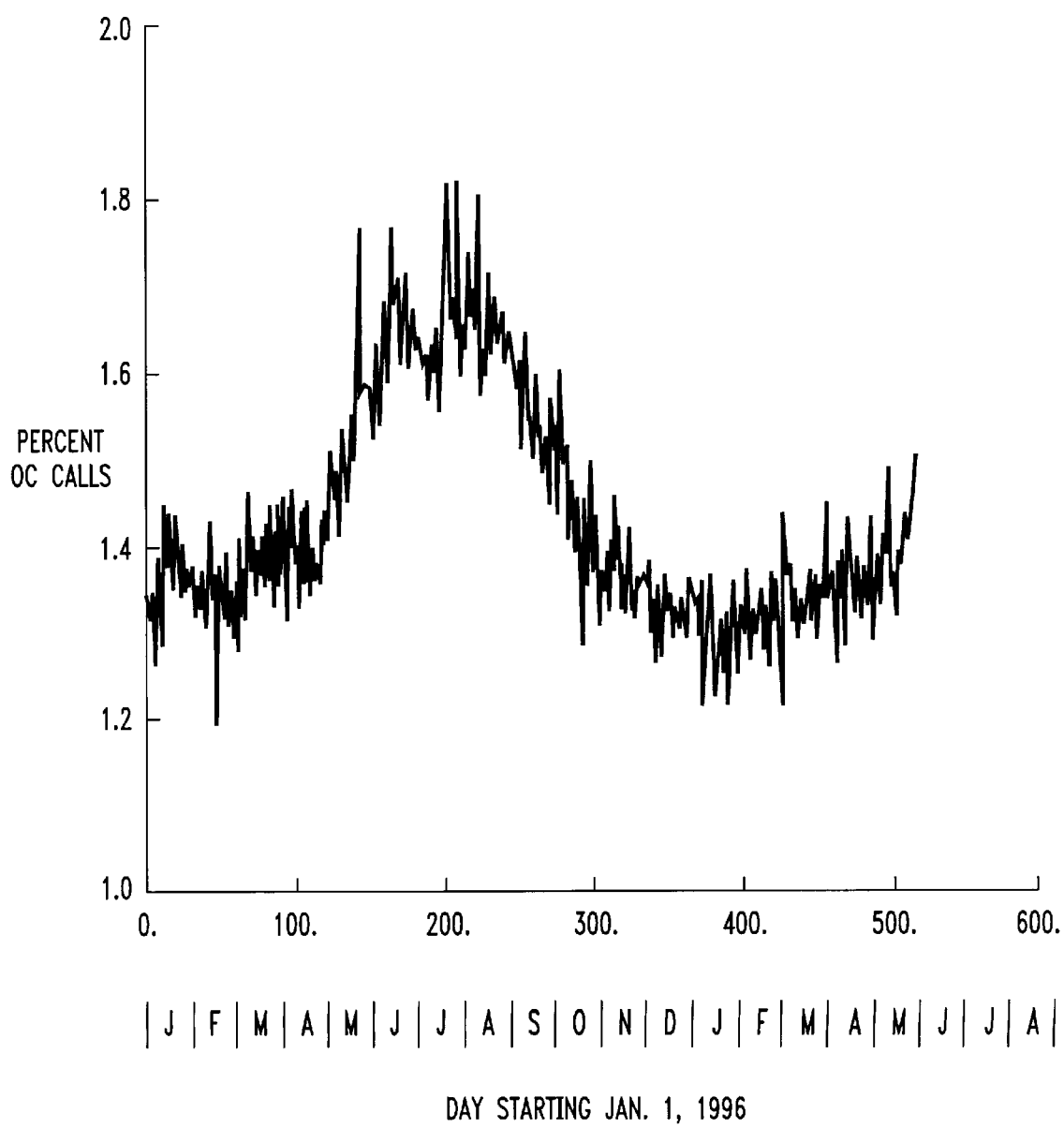
FIG. 2 is a graph that shows a percentage of cellular calls that were dropped between Jan. 1, 1996 and Jun. 1, 1997, in a typical American state, according to the prior art.
Figure 3:
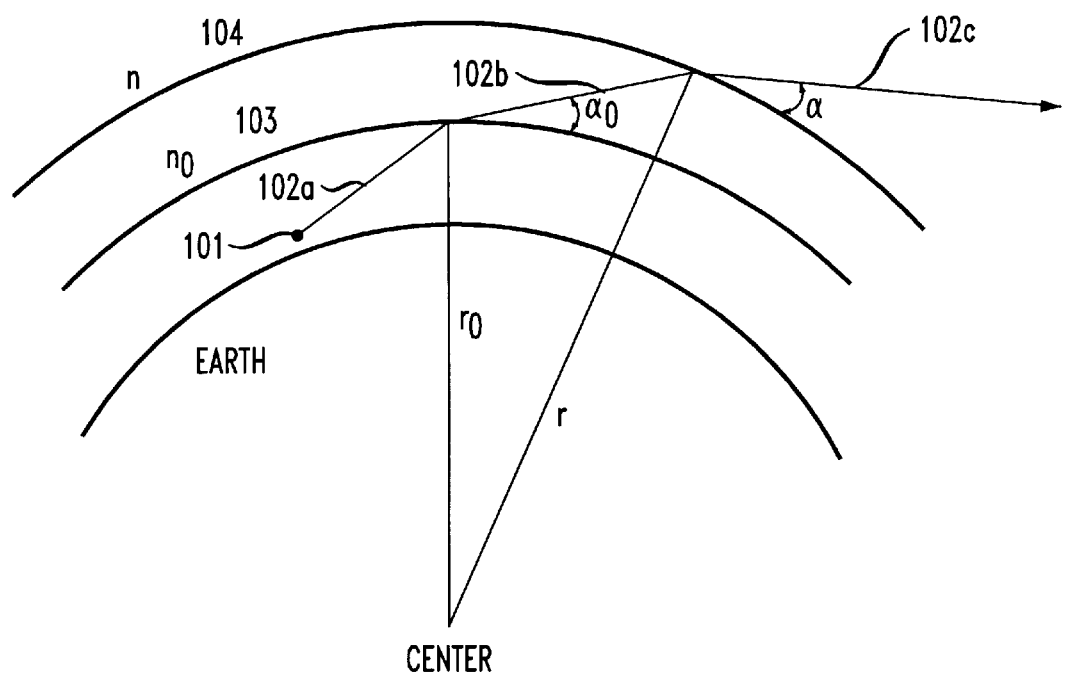
FIG. 3 is a diagram that illustrates the refraction of an energy wave in the atmosphere.
Figure 4:
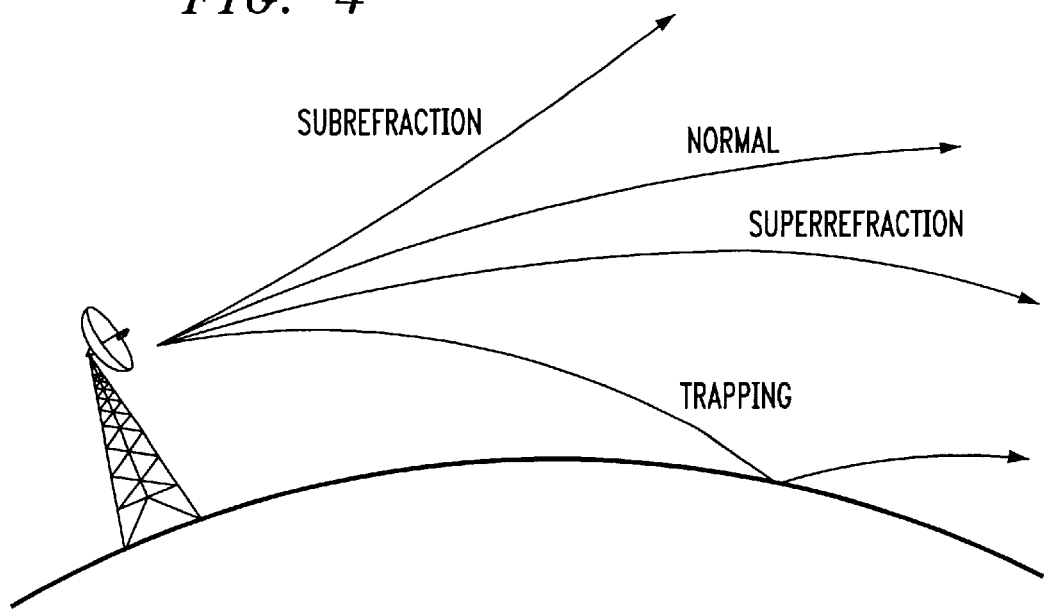
FIG. 4 is a diagram showing refractive conditions that can be experienced by a wireless transmission.

As previously discussed, FIG. 1 illustrates a typical wireless telecommunications system, comprising a plurality of base stations, depicted by base stations 203-1 through 203-5. Wireless terminals, depicted by terminals 201-1 through 201-3, communicate with a base station which is located in the cell as itself. For instance, wireless terminals 201-1 and 201-2 are located in cell A, therefore communicate with base station 203-1, which is located in and services cell A. In order for wireless terminal 201-1 to communicate, it sends a signal via radio waves to base station 203-1; base station 203-1 relays the received signal to a switching center (not shown); and the switching center, according to instructions supplied as part of the signal, relays the signal elsewhere. If the desired destination of the signal is another wireless terminal, then the switching center relays the signal to a base station located in the same cell as the wireless terminal intended to receive the signal, and the base station transmits the signal via radio waves to the wireless terminal.

As discussed previously, a wireless transmission can undesirably be transmitted from a wireless terminal to a base station which is not geographically located in the same cell as itself, or vice versa. For instance, wireless terminal 201-3 in cell D may transmit a wireless signal that interferes with wireless signals that are transmitted or received by base station 203-1 in cell A. This can occur, despite the fact that cell D and cell A are geographically remote with respect to each other, if an atmospheric duct exists between cell D and cell A, permitting radio waves transmitted in cell D to propogate far outside the cell in which it is located. The wireless transmission of terminal 201-3, if received at base station 203-1, will cause interference to the wireless transmissions from terminals 201-1 and 201-2 to base station 203-1.

Figure 5:
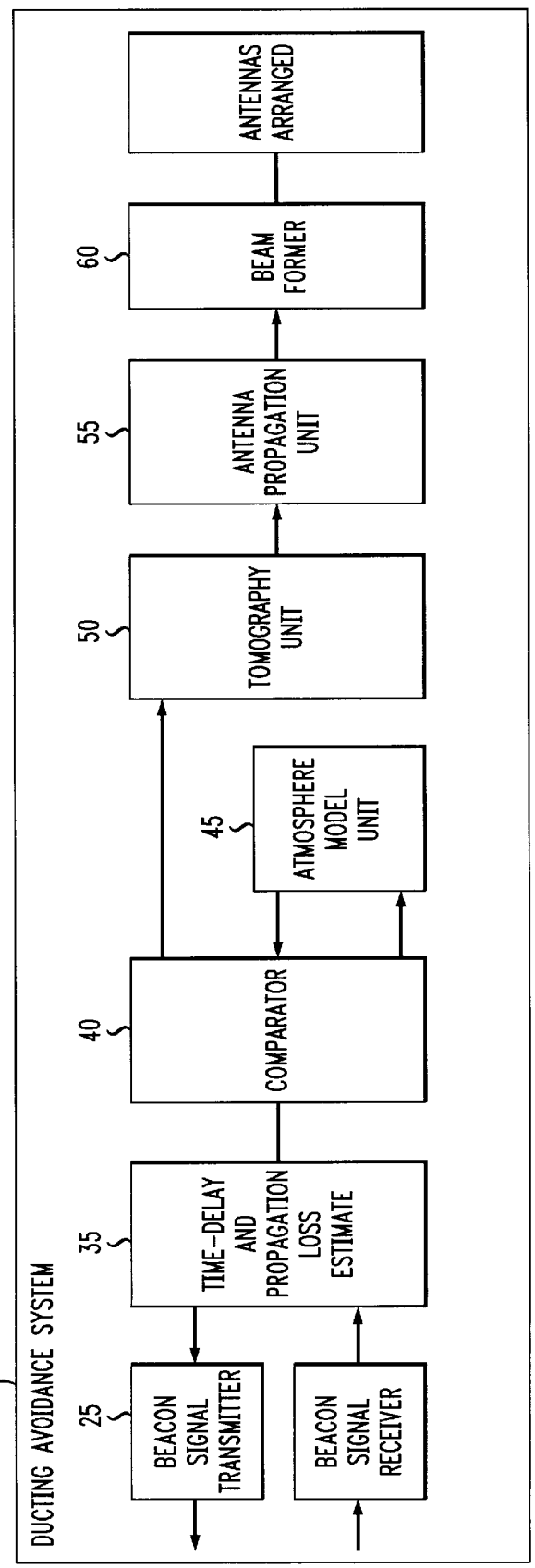
FIG. 5 is a diagram that illustrates a system for reducing the effect of atmospheric ducting on wireless transmissions, in accordance with one embodiment of the present invention.

FIG. 5 is a diagram that illustrates a system, in accordance with one embodiment of the present invention. FIG. 5 shows ducting avoidance system 20 having a plurality of beacon signal transmitters 25 and beacon signal receivers 30, advantageously one of each located at each base station in the wireless system. Each beacon signal transmitter 25 is configured to transmit wireless beacon signals to all of the other base stations in the system, which receive the wireless beacon signals via their beacon signal receiver 30. Thus, each beacon signal receiver 30 is configured to receive, in a wireless system having n base stations, n−1 wireless beacon signals. The beacon signals are advantageously orthogonal codes, or pseudo-random signals, to be received by a beacon signal receiver employing a correlation receiver.

In accordance with one embodiment of the invention, the beacon signals are transmitted on a reserved low power channel. In accordance with another embodiment, the beacon signals are transmitted on idle channels in the system.

Beacon signal receiver 30 is coupled to time delay and propagation loss estimator 35, and is configured to receive and process each wireless beacon signal. Time delay and propagation loss estimator 35 is coupled to comparator 40. Comparator 40 compares the time delay and the propagation loss, both of which are explained in greater detail below, for each received wireless beacon signal to expected time delay and propagation loss data that is stored in atmospheric model unit 45, and determines which of the paths between base stations have an atmospheric duct.

Comparator 40 is coupled to tomography unit 50. Tomography unit 50 compiles the data from comparator 40 regarding which wireless beacon signal paths have ducts, and processes it to map or profile the atmosphere in the region where wireless service is provided. As stated previously, tomography unit 50 may employ a tomography method as described in the Rogers reference (described more fully below).

Tomography unit 50 is coupled to antenna position unit 55. Antenna position unit 55 determines, based on the information received from tomography unit 50, the position of each antenna at each base station. In accordance with one embodiment of the invention, antenna position unit 55 determines an arrangement of the antennas at each base station so as to minimize the transmission of wireless signals in directions where the signals enter a duct. In another embodiment, antenna position unit 55 determines an arrangement of the antennas at each base station so as to minimize interference at the base station caused by the transmission of wireless signals through the location.

Antenna position unit 55 is coupled to beamformer 60 at each base station. Beamformer 60 functions to shape the transmission of each base station. In accordance with one embodiment, the antenna is positioned in the optimal position for reducing the effect of ducting, as determined by antenna position unit 55. As is well known in the art, a beamformer is a processor used in conjunction with an array of sensors (not shown in FIG. 5) to provide an antenna with spatial filtering. Spatial filtering permits an antenna to separate signals that arrive at the antenna from different spatial locations, such as where a receive antenna array is configured to optimize energy from desired directions while simultaneously nulling or jamming interfering signals. Thus, in accordance with one embodiment of the invention, a base station antenna with a beamformer 60 is arranged so that beamformer 60 does not point significant energy toward the location having an atmospheric duct. By pointing beamformer 60 away from the location having a duct, the likelihood that interfering signals will be received by a base station is reduced.

There are several ways that beamformer 60 may function to shape the transmission of each base station. For instance, in one embodiment of the invention, the amplitude and phase of the transmitting antenna elements are electronically changed so as to minimize power transmission into the direction of a duct. In another embodiment of the invention, the antenna is physically moved so as to align the null of the base station (which is ordinarily tilted so as to point a few degrees above the horizon) with the direction of the ducting.

Figure 6:
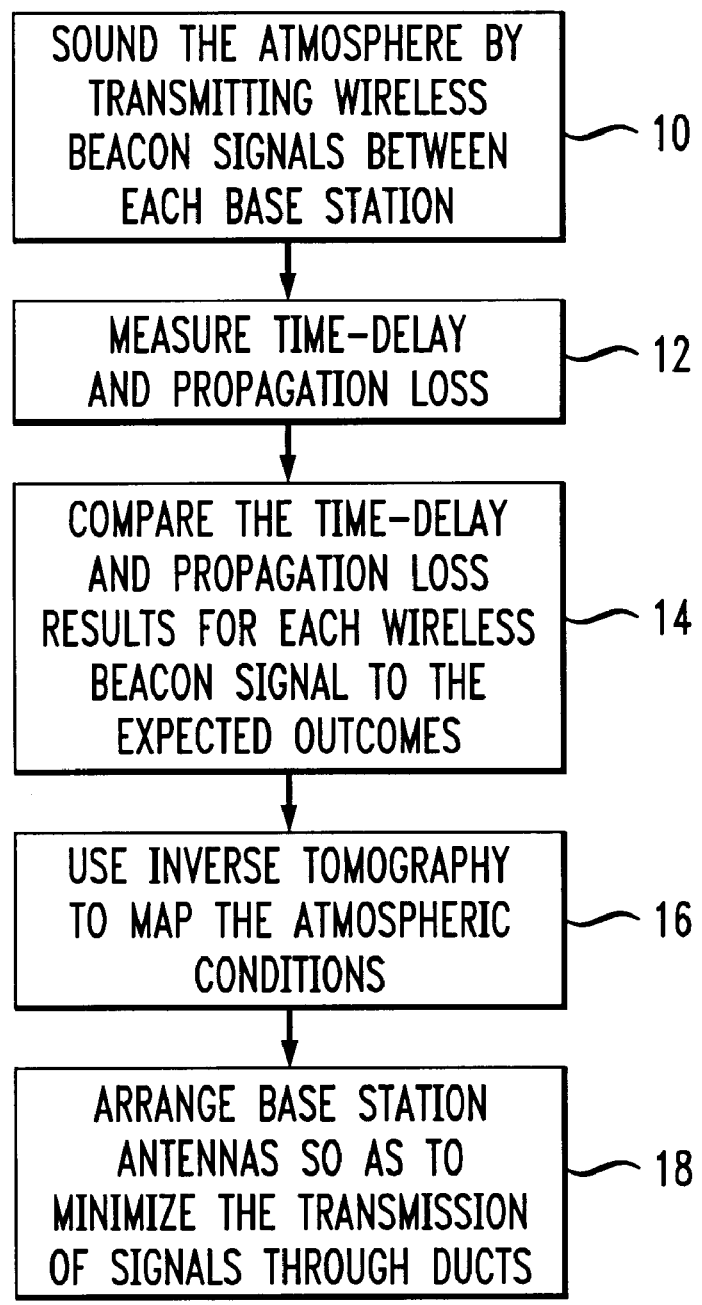
FIG. 6 is a flow chart that illustrates a method for reducing the effect of atmospheric ducting on wireless transmissions, in accordance with one embodiment of the invention.

FIG. 6 is a flow chart that illustrates, in accordance with one embodiment of the present invention, a method for reducing the effect of atmospheric ducting on wireless transmissions. At step 10, the wireless system sounds the atmosphere, in the region serviced by the system, by transmitting a wireless beacon signal via radio waves from each base station in the system to every other base station in the system. This wireless beacon signal is transmitted between each and every base station, not just base stations that are located in cells which are geographically adjacent to each other. Thus, for example, in FIG. 1, base station 203-1 sends a wireless beacon signal to base stations 203-2, 203-3, 203-4 and 203-5, even though base stations 203-4 and 203-5 are located in cells D and E which are geographically remote from cell A in which base station 203-1 is located.

At step 12, a time-delay and a propagation loss of each wireless beacon signal are measured. The time-delay is the amount of additional time that a wireless beacon signal actually requires to travel from the transmitting base station to the destination base station, as compared to the amount of time that the wireless beacon signal would have required to travel an equivalent distance through free space (free space is a vacuum condition, and is considered the ideal propagation environment). Measuring the time-delay, in addition to received power, is preferred because changes in time-delay over a propagation path is directly related to the refractivity of the atmosphere. The propagation loss is defined as the ratio of the power of the wireless beacon signal, as transmitted by the transmitting base station, to the power of the wireless beacon signal, as received by the destination base station, normalized to unity gain for both base stations, as is well known in the art.

At step 14, the time delay and propagation loss results for each wireless beacon signal are compared to the outcomes that are expected to occur when a wireless signal is transmitted between the transmitting base station and the destination base station. At step 16, tomography is used to map or profile the refractivity of various regions in the atmosphere. Specifically, from the refractivity of the various regions in the atmosphere, it is determined where atmospheric ducting is occuring.

One method of profiling the atmosphere of the region serviced by a wireless system, that analyzes propagation characteristics in the region, is described in L.T. Rogers, *Likelihood Estimation of Tropospheric Duct Parameters from Horizontal Propagation Measurements*, Radio Science Bulletin, pp. 7914 92 (January 1997), which is incorporated herein as fully as if set forth in its entirety. Rogers discloses a refractivity inversion technique wherein the atmospheric refractivity is determined from horizontal measurements of radio-frequency propagation. Generally, this technique is the inverse of a procedure described in M. F. Levy, *Parabolic Wave Equation Techniques for Radiowave Propagation*, Radio Science Bulletin, pp. 6–12 (September 1997), which is also incorporated herein as fully as if set forth in its entirety. Specifically, Levy computes propagation characteristics from a known atmospheric profile. FIG. 7(*b*), which is explained in greater detail below, is a flowchart that illustrates the steps performed by an algorithm that forms propagation models from atmospheric sounding measurements, in accordance with one embodiment of the present invention.

Returning to the flow chart of FIG. 6, at step 18, the base station antennas are arranged corresponding to the location of the duct. In the preferred embodiment of the invention, the base station antennas are arranged so as minimize the transmission of w wireless signals through areas that are determined to have ducts. According to one embodiment, steps 10 through 18 are repeated periodically, although it is noted that weather patterns, and more specifically atmospheric duct patterns, are slow to change relative to the length of the typical cellular phone call. In particular, ducting conditions develop over several hours or days and dissipate suddenly. Once dissipated, the duct no longer interferes with the transmission of signals and no longer needs to be considered. The method, in accordance with one embodiment of the present invention, is repeated approximately every several hours. However, the present invention, in accordance with one embodiment, contemplates the repetition of the method at any time interval.

In another embodiment of the invention, the beacon signal is transmitted in a direction where ducting is expected, or has been observed empirically, to occur, and an adaptive phased array receiver is utilized to estimate the direction of arrival. For instance, referring to FIG. 1, base station 203-4 may employ an adaptive phased array receiver which is arranged to receive signals transmitted from the direction of base station 203-1. If it is determined from the transmission of a wireless beacon signal between base station 203-1 and base station 203-4 that an atmospheric duct exists along the transmission path between the two base stations, then base station 203-1 is advantageously arranged so as not to transmit in a direction received by base station 203-4, and 203-4 is advantageously arranged so as not to receive transmissions from the same direction.

Figure 7A:
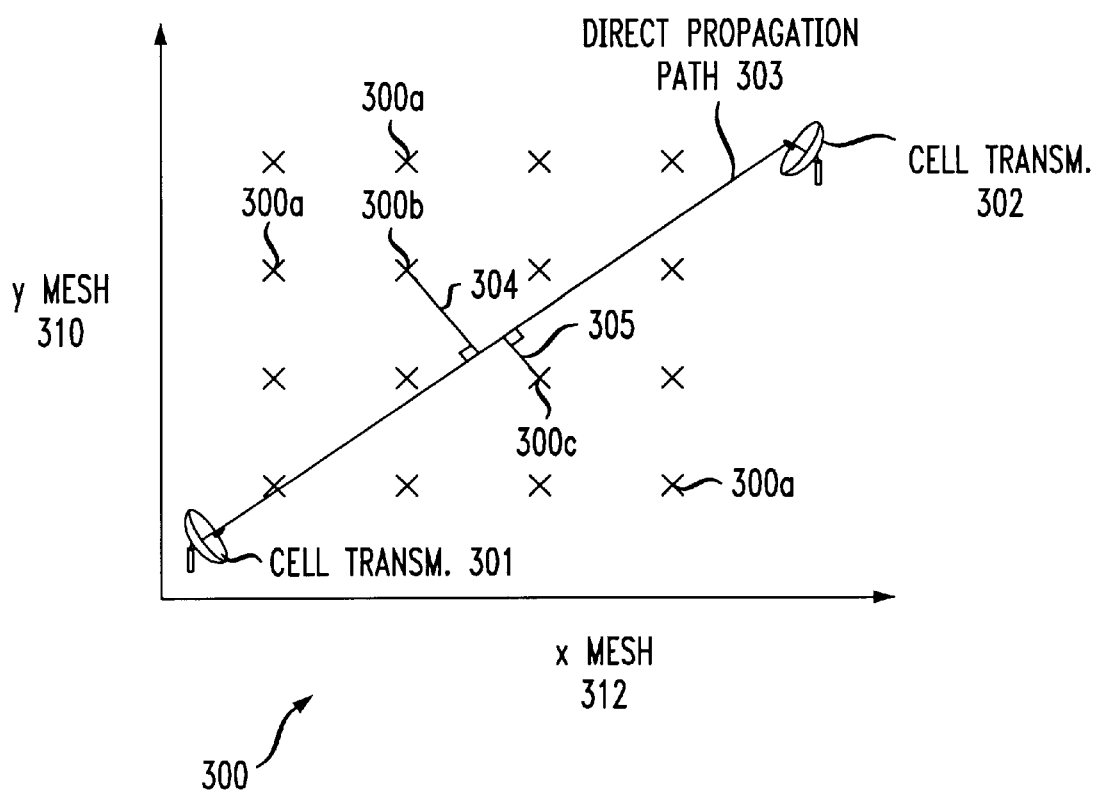
FIG. 7(a) is a diagram illustrating a grid of mesh points, in accordance with one embodiment of the invention.

FIG. 7(a) is a diagram which illustrates a sample wireless grid 300. The grid has a y-mesh 310 which defines a mesh point position in a first direction, and an x-mesh 312 which defines a mesh point position in a second direction. Mesh points 300a are markers that designate positions in a wireless system, such as a position of a weather balloon that is capable of measuring weather conditions. In the preferred embodiment, the distance between mesh points are at most ½ to ¼ the distance of the typical radius of a cell, as shown in FIG. 1. Mesh points are represented in FIG. 7(a) as "x", and are shown equidistant from each other mesh point, although it is recognized that mesh points may have varying spacing.

Figure 7B:
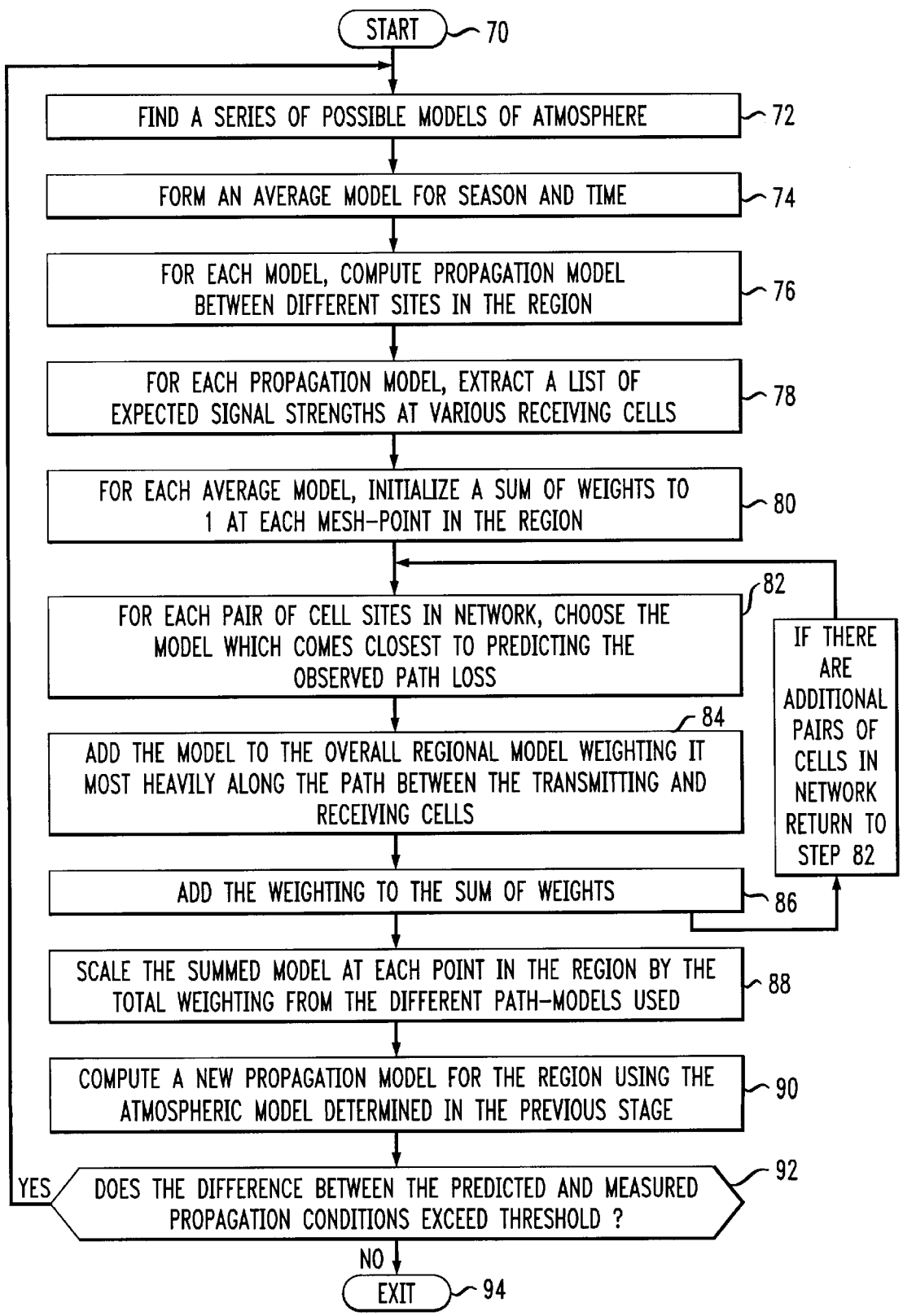
FIG. 7(b) is a flowchart illustrating the steps performed by an algorithm that forms propagation models from atmospheric sounding measurements, in accordance with one embodiment of the invention.

Also shown in FIG. 7(a) are base station 301 and base station 302. Although only two base stations are illustrated in this figure, a typical wireless system employs numerous base stations, and the two are merely shown for purposes of example. Line 303 represents a direct propagation path between base station 301 and base station 302. Each pair of base stations in a wireless system have a direct propagation path therebetween. Each mesh point 300a is located at a measurable distance from the propagation path 303. For instance, the length of line 304 represents the distance from mesh point 300b to propagation path 303. FIG. 7(b) is a flowchart that illustrates the steps performed by an algorithm that employs a mesh-point grid, in accordance with one embodiment of the present invention Specifically, FIG. 7(b) is a flowchart that illustrates the steps performed by an algorithm that forms propagation models from atmospheric sounding measurements, in accordance with one embodiment of the present invention. At step 70, the algorithm starts. At step 72, the algorithm finds a series of possible models of the atmosphere. These may be, according to one embodiment, a range of theoretically possible climates models, but in a preferred embodiment, is derived from observations culled from weather balloons throughout the region of interest. For instance, according to one model of an atmosphere, temperature, relative humidity and pressure are determined at each mesh point 300a of FIG. 7(a) as a function of height. At step 74, the algorithm forms an average atmospheric model. In a preferred embodiment, the average atmospheric model is appropriate for both the season and the time of day.

At step 76, for each climate model, the algorithm computes propagation models between the different cell sites in the region. Preferably, the propagation models account for and include the elevation and directionality of the antennas in the network. One method of performing this computation is described in the Levy reference. Levy employs parabolic wave equation techniques to provide numerical solutions for electromagnetic wave propagation problems, by factoring wave equations into terms representing forward and backward propagating energy. Specifically, Equations 6 through 9 of Levy describe a split-step Pade parabolic equation method involving second-order derivatives.

At step 78, for each propagation model computed in step 76, the algorithm extracts a list of expected signal strengths at various receiving cells. At step 80, for each average model, the algorithm initializes a sum-of-weights to 1 at each mesh-point in the region. Next, for each pair of cell sites in the network, the algorithm performs steps 82 through 86. First, at step 82, the algorithm chooses the model which comes closest to predicting the observed path loss.

At step 84, the algorithm adds the model chosen in step 82 to the overall regional model. In doing so, the algorithm weights the addition of the chosen model to the overall regional model most heavily along the path between the transmitting and receiving cells. For instance, the algorithm weights the addition of the chosen model as a function of its distance from a propagation path, e.g.—most heavily for those mesh points which are at a shorter distance from a propagation path. Thus, according to one embodiment, the algorithm determines for propagation path 303 of FIG. 7(a) a greater weight corresponding to mesh point 300c than it determines for mesh point 300b, by virtue of its shorter distance from propagation path 303, as shown by lines 305 and 304, respectively.

In one embodiment, the weight, W, of mesh point x,y as a function of its distance from a propagation path between two base stations is designated as:

$$W_{x,y}=1/(c+d^2),$$

where c is the distance between mesh points in the wireless system and d is the distance from mesh point x to the propagation path. However, according to one embodiment of the invention, the algorithm does not weight a particular mesh point if its distance from a particular propagation path is greater than a predetermined distance.

At step 86, the algorithm adds the weighting of step 84 to the sum-of-weights initialized in step 80. At step 88, the algorithm scales the summed model at each point in the region by the total weighting from the different propagation models used. At step 90, the algorithm computes a new propagation model for the region using the atmospheric model determined in the previous stage. Thus, according to one embodiment, the propagation model at mesh point x,y is designated by the formula:

$$m_{x,y} \geq [\Sigma_{n,m} \ m(j_{n,m}) \times W_{x,y}(n,m)]/\Sigma_{n,m} \ W_{x,y}(n,m),$$

where $j_{n,m}$ is the atmospheric model which is determined to the best match for base stations n and m, and $W_{x,y}$ (n,m) is the weight at the mesh point for that atmospheric model.

At step 92, the algorithm determines whether the difference between the predicted propagation conditions and measured propagation conditions exceeds a threshold. In a preferred embodiment, the threshold allows for both measurement and models errors, and is in the range of 3 to 15 dB. If, at step 92, the algorithm determines that the difference between the predicted propagation conditions and measured propagation conditions exceeds a threshold, then the algorithm returns to step 72 in order to update the model by continuing the process of sounding the atmosphere and re-performing the steps above. If, at step 92, the algorithm determines that the difference between the predicted propagation conditions and measured propagation conditions does not exceed a threshold, then the algorithm proceeds to step 94 and exits.

With reference to step 74, it is important to note that the averaging of the atmospheric model is performed because, typically, atmospheric parameters (such as temperature, pressure and relative humidity) are reasonably continuous as a function of height. In addition, these parameters are constrained to well-known physical ranges, e.g.—relative humidity is constrained to the range of 0% to 100%.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. A method for reducing the effect of atmospheric ducting on wireless transmission said method comprising the steps of:
   transmitting a wireless beacon signal from each of a plurality of base stations in a wireless communication system to a plurality of other base stations in said system;
   measuring a time delay and a propagation loss of each said wireless beacon signal;
   comparing said time delay and propagation loss for each said wireless beacon signal to an expected time delay and propagation loss corresponding to said wireless beacon signal;
   processing the results of said comparing step so as to determine a location of an atmospheric duct; and
   arranging an antenna at each said base station corresponding to said location.

2. The method according to claim 1, further comprising arranging an antenna at each said base station so as to minimize said transmission of wireless signals through said location, while maintaining said transmission of said signals in a desired direction.

3. The method according to claim 1, further comprising arranging an antenna at each said base station so as to minimize interference at said base station caused by said transmission of wireless signals through said location.

4. The method according to claim 1, wherein said transmitting step further comprises transmitting a wireless beacon signal from each of a plurality of base stations in a wireless communication system to every other base station in said system.

5. The method according to claim 1, wherein said method is repeated at various time intervals.

6. The method according to claim 1, wherein said transmitting step further comprises transmitting said wireless beacon signal on a reserved low-power channel.

7. The method according to claim 1, wherein said transmitting step further comprises transmitting said wireless beacon signal on an idle channel of said system.

8. The method according to claim 1, further comprising the step of generating orthogonal codes to be transmitted as said wireless beacon signal.

9. The method according to claim 1, further comprising the step of generating pseudo-random signals to be transmitted as said wireless beacon signal, and correlating said received signals when received at said plurality of other base stations in said system.

10. A system for reducing the effect of atmospheric ducting on wireless transmissions, said system comprising:
    a plurality of base stations having antennas, each said base station having a beacon signal transmitter and a beacon signal receiver, each said beacon signal transmitter configured to transmit a wireless beacon signal to be received by said beacon signal receiver at a plurality of other said base stations;
    a time delay and propagation loss estimator, coupled to said beacon signal receiver and configured to measure a time delay and a propagation loss of each said wireless beacon signal;
    an atmospheric model unit for storing an expected time delay and an expected propagation loss corresponding to each said wireless beacon signal;
    a comparator, coupled to said time delay and propagation loss estimator and to said atmospheric model unit, said comparator configured to compare, for each said wireless beacon signal, said time delay and said propagation loss to said expected time delay and to said expected propagation loss corresponding to said wireless beacon signal;
    a tomography unit, coupled to and configured to communicate with said comparator, said tomography unit further configured to process data received from said comparator and to determine a region wherein said atmospheric ducting is occuring; and
    an antenna position unit, coupled to said tomography unit and configured to determine an arrangement of said antennas corresponding to said location.

11. The system according to claim 10, wherein said antenna position unit is further configured to determine an arrangement of said antennas so as to minimize said transmission of wireless signals through said location, while maintaining said transmission of said signals in a desired direction.

12. The system according to claim 10, wherein said antenna position unit is further configured to determine an arrangement of said antennas so as to minimize said interference caused by said transmission of wireless signals through said location.

13. The system according to claim 10, further comprising a beamformer, said beamformer coupled to said antenna position unit and configured to position said antennas in said arrangement determined by said antenna position unit.

14. The system according to claim 10, wherein each said beacon signal transmitter is further configured to transmit a wireless beacon signal to be received by said beacon signal receiver at every other said base station.

15. The system according to claim 10, wherein each said beacon signal is transmitted on a reserved low-power channel.

16. The system according to claim 10, wherein each said beacon signal is transmitted on an idle channel of said system.

17. The system according to claim 10, wherein each said beacon signal is an orthogonal code.

18. The system according to claim 10, wherein each said beacon signal is a pseudo-random signal, and wherein each said receiver employs a correlation receiver.

19. The system according to claim 10, wherein said receiving base stations employ an adaptive phased array arrangement.

* * * * *